Patented Oct. 20, 1925.

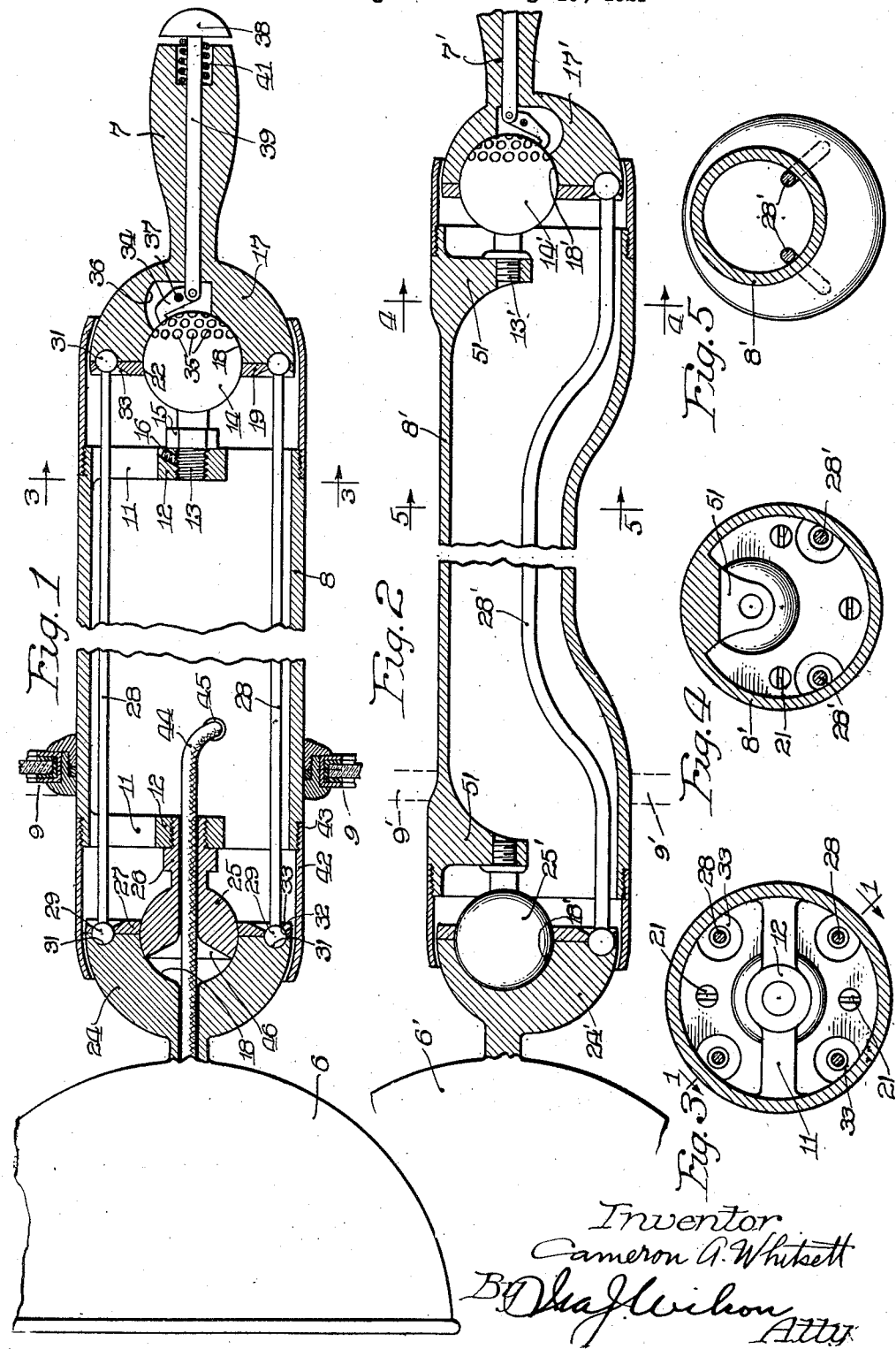

1,558,421

UNITED STATES PATENT OFFICE.

CAMERON A. WHITSETT, OF CHICAGO, ILLINOIS, ASSIGNOR TO FYRAC MANUFACTURING COMPANY, OF ROCKFORD, ILLINOIS, A CORPORATION OF ILLINOIS.

SPOTLAMP.

Original application filed August 15, 1921, Serial No. 492,275. Divided and this application filed September 13, 1924. Serial No. 737,483.

*To all whom it may concern:*

Be it known that I, CAMERON A. WHITSETT, a citizen of the United States, and resident of Chicago, in the county of Cook and State of Illinois, have invented a certain new and useful Improvement in Spotlamps, of which the following is a full, clear, concise, and exact description, reference being had to the accompanying drawings, forming a part of this specification.

The present invention relates to spot lamps for automobiles, motor boats, and the like. More specifically, the invention is concerned with that type of spot lamp which, in the automobile adaptation, is operable from a control mechanism located within the driver's compartment. The preeminent advantage of this construction resides in the ability to operate the spot lamp from within the car in any type of car and under any condition. Spot lamps having this interior control feature are particularly adaptable to use on limousines and other closed cars, and, in fact, are the only types of spot lamps which can be practically mounted on a closed type of car. Similarly, in the case of the open body car, this control feature permits convenient operation of the spot lamp when the side curtains of the car are up, without the objectionable necessity of unfastening the side curtains, and exposing the hand or arm to the weather.

One of the particular objects of the present invention is to simplify and facilitate the operation of such types of spot lamps, by providing an improved and simplified form of control mechanism which can be operated with the utmost facility.

A secondary object is to provide an improved form of spot lamp adapted for mounting in the automobile windshield, in which a relatively wide range of adjustment is available.

A further object of the invention is to provide an improved form of lock or detent for locking the lamp in any adjusted position. This improved form of lock is so devised that its operation does not hinder or encumber the adjustment of the lamp.

The present application is divisional of my co-pending application Serial No. 492,275, filed August 15, 1921.

Referring to the accompanying drawing, in which I have illustrated a preferred embodiment of my invention:

Figure 1 is a longitudinal sectional view through one form of my invention;

Figure 2 is a similar view of a slightly modified construction;

Figure 3 is a transverse sectional view taken on the plane of the line 3—3 of Figure 1; and Figures 4 and 5 are transverse sectional views taken on the planes of the lines 4—4 and 5—5, respectively, of Fig. 2.

Referring to Figure 1, the spot lamp adapted to receive an electric lamp or other light source and forming a lamp holder is fragmentarily illustrated at 6 and the control handle is indicated at 7. Extending between the lamp and the control handle is a tubular housing or sleeve 8, which may be mounted by a bracket or clamp on the windshield of the car, or which may be extended through a hole in the corner rail or through a hole in the windshield glass. A windshield through which the spotlight assembly is adapted to pass is illustrated at 9 in Fig. 1, and is a conventional modification of the windshield clamping members illustrated and described in my copending application, Serial No. 492,275, filed August 15, 1921 and my copending application Serial No. 563,631, filed May 25, 1922. This figure illustrates but one arrangement whereby the light may be secured in the windshield for operation therethrough. In Fig. 2 the windshield glass or corner post of the machine may be considered as diagrammatically represented by the dotted lines 9'. Any suitable fastening means may be employed for mounting this housing or sleeve 8 in the hole cut in the car enclosure. At each end the sleeve 8 is formed with a bridge 11 extending diagrammatically across the same, each of these bridge members having central hubs 12 which are internally threaded. Screwing into the rear hub 12 is a stud 13 which carries a ball 14 at its end. A nut 15 on the stem enables the stem to be rigidly screwed into the hub 12, and a set screw 16 may be employed for locking the stud in place. The handle 7 is arranged for universal movement about the ball 14, and to this end is formed with a semi-spherical head 17 which is provided with a semi-spherical socket 18 engaging over the ball 14. To hold the head member 17 on the ball 14, a disc 19 is screwed to the diametrical face of the head 17 by screws 21, this disc having a central opening 22 of spherical curvature which embraces the other half of the ball and prevents the head 17 from being withdrawn or displaced from the ball.

The lamp 6 is similarly provided with a semi-spherical head 24, the flat face of which is cut on a diametrical plane to enable the head to be readily assembled over a ball 25 on the front end of the stem 26 which screws into the front hub 12. A disc 27, similar to the disc 19, is screwed to the face of the head 24 to hold the latter in place on the ball 25. The universal motion of the handle 7 is transmitted to the lamp 6 through a series of connected rods or links 28, preferably four in number, which connect the head 17 with the head 24. As that shown in Figure 3, these rods or links are equi-distantly arranged around the axis of the heads 17 and 24, and to accommodate these various angular motions of the members 17 and 24, the ends of these rods or links have ball and socket mountings in the heads. This is preferably accomplished by forming spherical ends 29 on the rods and seating these ends or ball tips in the semi-spherical depressions 31 in the faces of the two heads 17 and 24. The discs 19 and 27 have openings 32 of spherical curvature which embrace the backs of the ball tips 29 and retain the latter in the spherical depressions 31. The openings 32 in these discs are flared outwardly at the rear as indicated at 33 to permit extensive angular motion of the heads 17 and 24 without binding on the rods 28.

The lamp is adapted to be locked in any adjustable position by a pawl 34 which is recessed into the inner head 17, and which is adapted lock in any one of a series of locking holes 35 on the inner face of the ball 14. The pawl 34 is pivoted in a slotted recess 36 on a pin 37 extending transversely through the head 17. The pawl is adapted to be retracted from the locking holes 35 by the inward depression of a button 38 at the outer end of the control handle 17. This button 38 connects through a reciprocable rod 39 which has pivotal connection with the inner end of the pawl, the pawl being normally thrust into one of the locking holes 35 by a compression spring 41 which is counterbored in the outer end of the handle 7.

The ends of the tubular housing 8 are closed by cylindrical shells 42 which screw over the threaded ends 43 of the tubular housing, the outer ends of these shells being contracted spherically to partially embrace the semi-spherical heads 17 and 24. The electrical conducting cord 44 enters the tubular housing 8 through the opening 45 and extends through longitudinal bores drilled in the ball and stem 25—26 and in the head 24. The front part of the ball 25 is cut out, as indicated at 46, to avoid pinching of the conductor 44 when the head 24 is inclined.

It will be apparent that any inclination imparted to the head 17 through the handle 7 will be transmitted to the head 24 at the same angle and in like degree through the rods 28—28. For example, a downward inclination of the operating handle 17, such as one would incidentally give the rear handle on the ordinary spot light for directing the beam upwardly, draws the two upper rods 28 backwardly under tension and pushes the two lower rods 28 forward under compression, thereby rocking the head 24 to elevate the lamp 6 and direct the light beam upwardly. This operation of thrusting some of the rods forwardly and drawing others backwardly, obviously follows irrespective of whether the handle 7 is inclined horizontally, vertically, or at any intermediate angle.

It is not essential that four rods 28 be employed, as three would suffice, and in Figure 2 I have illustrated an embodiment employing only two rods. In this form, the intermediate portion of the tubular housing 8' may be contracted to a smaller dimension by having the reduced number of rods. The balls 14' and 25' are mounted in lugs 51 projecting downwardly and inwardly from the ends of the tubular housing 8'. The two semi-spherical heads 17' and 24' have their socket depressions 18' arranged eccentrically, so as to give a greater radius of head below the balls 14'—25' for connection with the rods 28'. The two rods have pivotal connection with the heads at lower diagonal points thereof, as shown in Figures 4 and 5. The rods 28' have the previous form of ball and socket connection with the heads, and in the contracted portion of the tubular housing 8' are curved upwardly and inwardly, as clearly shown in Figure 5.

It will be apparent that upon raising or depressing the handle 7' in a substantially vertical plane, the rods 28' act conjointly under tension or compression to raise or lower the lamp 6'. Upon a horizontal motion of the operating handle 7', or any motion thereof involving a horizontal component, one rod 28' will be thrust forwardly and the other drawn backwardly to turn the lamp to the right or left, as the case may be. Obviously, this lateral swing of the lamp can be combined with any vertical depression or elevation, so that the range of adjustment from the handle 7' is substantially universal within its field of movement.

I do not intend to be limited to the particular details of the specific embodiment herein shown and described, it being apparent that this specific embodiment is merely an exemplification of the essence of the invention.

I claim:

1. In a windshield spotlight in combination, a generally tubular housing extending substantially horizontally, a ball and socket joint at one end of said housing, a lamp supported by said ball and socket joint, an operating handle at the other end of said housing, and means having a translational motion for transmitting the adjusting motion of said handle to said lamp.

2. A wall receivable spotlight for automobiles and the like comprising, a tubular housing adapted to extend through a wall, a spotlight pivotally supported for swinging movement in a plane substantially perpendicular to the plane of the wall through which the housing extends at the front end of said housing, an operating handle pivotally supported at the rear end of said housing for movement in the same plane, and actuating means connecting said operating handle with said spotlight extending from end to end through said housing for reciprocal motion in the plane of swinging movement of said spotlight, said actuating means swinging said spotlight in substantial parallelism with the angle of adjustment of said handle, said handle, housing and spotlight having their axes so relatively aligned that said handle will point said spotlight.

3. In combination, a tubular housing adapted to be situated in a wall of a vehicle body and to project on opposite sides thereof, ball sockets formed in the ends of said housing, a first ball mounted in one end of said housing in the socket therein and having a lamp supported thereon, a second ball mounted in the socket in the opposite end of the housing and having an operating handle supported thereon, and a plurality of rods connecting said handle to said lamp, each extending therebetween within said housing and operative to transmit universal adjusting motion thereto.

4. In combination, a tubular housing adapted to be situated in a wall of a vehicle body and to project on opposite sides thereof, ball sockets in the end of said housing, a first ball mounted in one end of said housing in the socket therein and having a lamp supported thereon, a second ball mounted in the socket in the opposite end of the housing and having an operating handle supported thereon, a plurality of rods extending between said balls for transmitting universal adjusting motion of said handle to said lamp, and co-operative locking means between one ball and the handle for locking said lamp in various positions of adjustment.

5. A spotlight comprising, a longitudinal tubular body adapted to be projected through a glass shield of automobiles and the like and having means for securing it therethrough, a light reflector having a rigid connection pivotally arranged for swinging movement in one plane at one end of said body member, a handle pivotally arranged at the other end of said body member, said handle and reflector pivots being on a line substantially coincident with the axis of said body, and a connecting rod wholly within said tubular body and pivotally connected to said rigid connection and handle eccentrically of the pivots thereof.

6. A spotlight comprising, a tubular body member adapted to be projected through a sheet of glass for attachment on automobiles and the like, means for securing said member in position through said glass, a spotlight pivotally connected within one end of said member for swinging movement in a plane substantially perpendicular to the plane of said sheet of glass, a handle similarly connected to the other end of said member, said spotlight and handle pivots being on a line substantially coincident with the axis of said member, and a plurality of rigid connecting means wholly within said member connecting said spotlight pivot and said handle pivot for transmitting movements of one to the other.

7. An automobile windshield spotlight comprising, a tubular body member adapted to project upon opposite sides of a windshield, means for securing said body member to and through the glass of a windshield, a spotlight having a stem pivotally secured within one end of said body member, a handle having a part pivotally secured within the other end of said body member, and a rod pivoted at its ends connecting said pivoted spotlight stem and pivoted handle part whereby movement of said handle about its pivot will move said spotlight about its pivot.

8. A spotlight comprising, a longitudinal tubular body member adapted to be projected through a glass shield of automobiles and the like and having means for securing it thereto, a lamp holder pivotally connected with one end of said body member for swinging movement in one plane thereat, a handle similarly pivotally connected at the other end of said body member for swinging movement in a plane substantially perpendicular to the plane of the shield and substantially transverse of the axis of the body member, a plurality of reciprocal connecting rods within said member pivotally connected to said lamp holder and handle eccentrically of the pivots thereof, and locking means having one portion rigidly fixed with respect to said member and a second portion co-operatively arranged and connected with said handle for swinging movement therewith and adapted for operation by the hand grasping the handle for locking said lamp holder in adjusted position.

9. A spotlight comprising, a tubular body member adapted to be projected through a sheet of glass attached on automobiles and the like, means for securing said member to said glass, a spotlight pivotally connected to one end of said member for swinging movement in planes perpendicular to the glass sheet and across the axis of the body member, a handle similarly connected to the other end of said member, a plurality of actuating means within said member connecting said spotlight pivot and said handle pivot for transmitting movements of one to the other, and locking means operatively associated with said handle for locking said spotlight in adjusted position, said locking means being simultaneously operable with said handle from any position of the handle.

10. A spotlight comprising, a hollow tubular housing having inwardly converging ends, a spotlight having a stem pivoted in one end of said housing and cooperative with the adjacent converged end of the housing to provide a closure therefor, a handle having a stem pivoted in the opposite end of the housing and cooperative with the adjacent converged end of the housing to provide a closure therefor, and a rigid link pivoted to and eccentrically of the pivots of said spotlight and handle stems for connection thereof whereby swinging movement of the handle will swing said spotlight correspondingly.

11. An automobile windshield spotlight comprising, a tubular body member forming a housing and adapted to project upon opposite sides of a windshield, means for securing said housing to and through the glass of a windshield, a spotlight having a stem in direct engagement with and pivotally secured to said housing at one end thereof, a handle having a part pivotally secured to and in direct engagement with the opposite end of said housing, and means including a reciprocal rod connected between said pivoted stem and pivoted handle part within said housing, whereby movement of said handle about its pivot will reciprocate said rod to move said spotlight about its pivot.

In witness whereof, I hereunto subscribe my name this 8th day of Sept., 1924.

CAMERON A. WHITSETT.